United States Patent
Balko et al.

(10) Patent No.: US 8,335,773 B2
(45) Date of Patent: Dec. 18, 2012

(54) STABLE LINKING AND PATCHABILITY OF BUSINESS PROCESSES THROUGH HIERARCHICAL VERSIONING

(75) Inventors: Soeren Balko, Weinheim (DE); Joachim Lindenberg, Walldorf (DE); Thilo-Alexander Ginkel, Heidelberg (DE); Reiner Hille-Doering, Karlsruhe (DE)

(73) Assignee: SAP AG, Walldorf (DE)

( * ) Notice: Subject to any disclaimer, the term of this patent is extended or adjusted under 35 U.S.C. 154(b) by 515 days.

(21) Appl. No.: 12/337,542

(22) Filed: Dec. 17, 2008

(65) Prior Publication Data
US 2010/0153153 A1   Jun. 17, 2010

(51) Int. Cl.
*G06F 7/00* (2006.01)
*G06F 17/00* (2006.01)
(52) U.S. Cl. ........................................ 707/694; 707/695
(58) Field of Classification Search .................. 707/694, 707/695
See application file for complete search history.

(56) References Cited

U.S. PATENT DOCUMENTS

| 5,557,793 A * | 9/1996 | Koerber ............................. 1/1 |
| 2003/0120651 A1 * | 6/2003 | Bernstein et al. ................. 707/6 |
| 2004/0210607 A1 * | 10/2004 | Manchanda et al. .......... 707/203 |

* cited by examiner

*Primary Examiner* — Robert Beausoliel, Jr.
*Assistant Examiner* — Mariela Reyes
(74) *Attorney, Agent, or Firm* — Mintz, Levin, Cohn, Ferris, Glovsky and Popeo P.C.

(57) ABSTRACT

A system, method and computer program product is presented for versioning a business process model. The business process model is decomposed into a number of artifacts. A hierarchical dependency graph is generated for the number of artifacts to produce, for each artifact, a set of referencing artifacts and a set of referenced artifacts. The set of referenced artifacts are compiled by creating a runtime format and computing a unique version identifier for each referenced artifacts, and the unique version identifier for each referenced artifact is incorporated into a version identifier of each associated referencing artifact from the set of referencing artifacts. At least one of the referenced artifacts is modified to produce a new version of the associated referencing artifact.

14 Claims, 4 Drawing Sheets

STABLE LINKING AND PATCHABILITY OF BUSINESS PROCESSES THROUGH HIERARCHICAL VERSIONING

BACKGROUND

This disclosure relates generally to business process management, and more particularly to stable linking, and patchability of business processes through hierarchical versioning.

Business process models comprise multiple artifacts including workflows, data mappings, tasks, texts, data types, etc. Typically, those artifacts are reused between different process models. Moreover, a modeler of the artifacts may change them often, but modifying certain artifacts more frequently than others. Meanwhile, running business process instances tend to have long lifecycles, potentially spanning multiple model refinements, making it sometimes necessary to "patch" previously deployed workflows and tasks. Conventional software lifecycle management approaches do not allow for stable linking, or patchability of business process.

In iterative process development, some artifacts like workflows (i.e., process control flow specifications) typically undergo multiple change-build-deployment-test cycles before ultimately being finalized. In contrast, other artifacts like referenced service interfaces (e.g., a WSDL interface for consuming a Web Service or calling a sub-workflow from within a process activity) will usually not be modified after they are initially imported into the process model. It is not desirable to have modifications in a single process model artifact (e.g, a workflow) necessarily affect all referenced artifacts (e.g., referenced service interfaces) that did not change at the same time.

SUMMARY

In general, this document discusses a system and method that addresses the issues of guaranteeing for deterministic execution with predictable behavior of process instances which includes a "stable linking" to the referenced artifact versions, and allowing for "patchability" of sub-workflows and tasks which transparently applies to running process instances. Further, the system and method disclosed reduces total cost of ownership (TCO) through lean resource consumption in a business process management (BPM) runtime software for artifacts that are reused from different referencing artifacts, such as a data type which is used in various workflows.

In one aspect, a computer-implemented method of versioning a business process model includes the steps of decomposing the business process model into a plurality of artifacts, and generating a hierarchical dependency graph for the plurality of artifacts to produce for each artifact a set of referencing artifacts and a set of referenced artifacts. The computer-implemented method further includes the steps of compiling the set of referenced artifacts by creating a runtime format and computing a unique version identifier for each referenced artifacts, and incorporating the unique version identifier for each referenced artifact into a version identifier of each associated referencing artifact from the set of referencing artifacts. The computer-implemented method further includes the step of modifying at least one of the referenced artifacts to also produce a new version of the associated referencing artifact.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method that provides for deterministic execution of process instances with predictable behavior, which includes a stable linking among referenced artifact versions. The system and method also allow for patchability of sub-workflows and tasks, (whenever a task or sub-workflow is modified, any running process instance which references this sub-workflow or task shall automatically incorporate those changes and invoke the modified sub-workflow and task), where patchability transparently applies to running process instances. The system and method reduces total costs of ownership through lean resource consumption in a business process management (BPM) runtime software for artifacts that are reused from different process versions.

Figure 1:
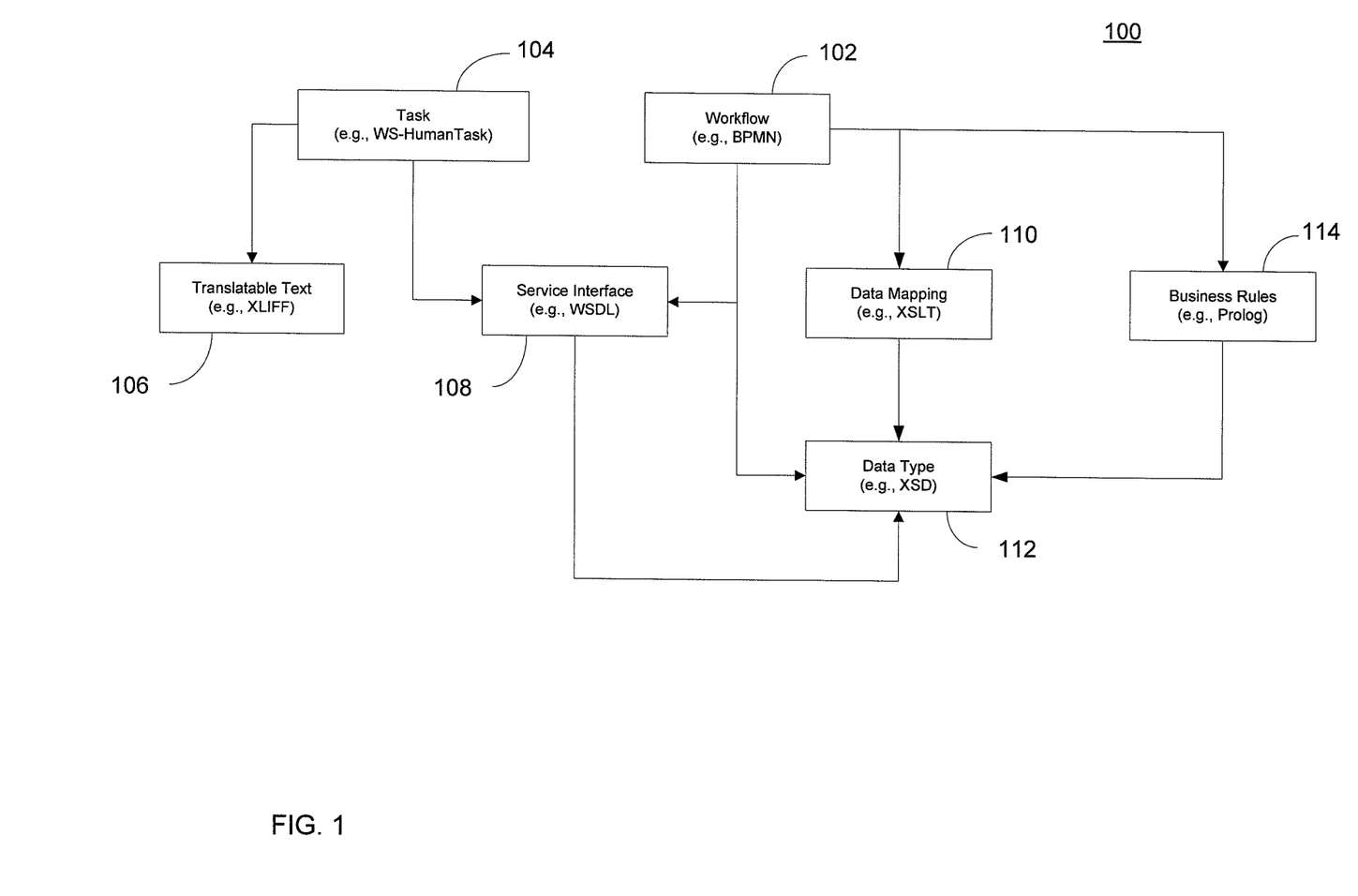
FIG. 1 illustrates a conceptual dependency graph for artifact types of a business process versioning system and method.

A preferred implementation of a versioning approach relies on a dependency graph between artifact types such as workflows, tasks, service interfaces, etc. which constrains actual artifact references within a concrete process model through usage dependencies. In detail, FIG. 1 is a dependency graph that illustrates artifact types being different process metamodel entities with different representations (e.g., BPMN for workflows, WS-HumanTask for tasks, WSDL for service interfaces, etc.) where arrows illustrate possible usage dependencies. The concrete artifact dependencies in the process model are an instance of this graph and may deviate to the extent that some artifact references are optional and cardinalities may differ. For instance, a workflow formulated in BPMN may not contain any data object entities, and may, thus, not have a direct dependency to any XSD file (representing data type information of data objects and the like). Further on, a workflow may comprise a message-based start event and may additionally include a human activity, such as a task invocation, which represents provisioning and consumption multiple service interfaces (e.g., WSDL files).

In accordance with an exemplary preferred implementation, as illustrated in FIG. 1, a business process management system 100 utilizes an arbitrary number of artifact types. Some of these artifact types may be described in further detail as follows:

Workflow 102 is the "root" artifact type that references all other artifact types. It represents the control flow of a process. Workflows 102 may be represented using standards such as Business Process Modeling Notation (BPMN), Business Process Execution Language (BPEL), and the like.

Tasks 104 are used to involve human actors into a process and represent entities of work. Tasks 104 may be associated with a form-based user interface and may be represented using standards such as WS-HumanTask.

Translatable texts 106 occur as process model data that is presented to an end user at runtime task titles, user interface labels, etc. Translatable texts 106 may be represented as XML Localization Interchange File Format (XLIFF) files.

Service interfaces 108 enable data flow into/out of workflows and tasks. Service interfaces 108 appear in process models to facilitate consumption and provisioning of services and specifically allow for de-coupling workflows from contained tasks and sub-workflows. As such, service interfaces are a prerequisite for "patchability". Service interfaces may be represented as Web Service Description Language (WSDL) files.

Data mappings 110 represent data flow within a process model. Data mappings 110 are used to transform the process state (represented as set of data objects) and to pass or fetch data to or from, respectively, service interfaces 108. Data mappings 110 may be represented as Extensible Stylesheet Language Transformations (XSLT) files.

Data types 112 provide semantics to data objects and constrain assigning values to data objects, particularly as part of data mappings 110. Furthermore, data types 112 may appear in business rules signatures, data mappings, and service interfaces. Data types 112 may be represented as XML Schema Definition (XSD) files.

Business rules 114 externalize business logics from workflows to allow for more flexibility of processes. Business rules 114 may be frequently changed to reflect environmental changes. Business rules 114 may be represented as Prolog programs for inference rules, or decision tables for simple if-then-else rules.

Sub-workflow (i.e. a workflow that is invoked from another workflow) and task invocations are decoupled from the invoking workflow via service interfaces. That is, the invoking ("outer") flow does not directly reference the to-be-invoked sub-workflow or task, but rather references a service interface which may conceptually be implemented (referenced) by multiple different sub-workflows and tasks. However, the primary purpose of de-coupling the invoking flow from the invoked sub-workflow or task is to achieve patchability of sub-workflows and tasks. Any sub-workflow or task whose service interface remains stable across their version history may constitute a "patch" for the previous version. Using late binding mechanisms at runtime, the invoking workflow will transparently incorporate the patched sub-workflow or task which is technically exposed behind the same service interface.

In preferred BPM runtime implementations, each service interface may correspond to a Web Service endpoint Uniform Resource Locator (URL) and a WSDL operation. Incoming Web Service requests may spawn instances of all "active" workflows and tasks which are provided through this service interface. At deployment of a patched (sub-)workflow (or task) version into the BPM runtime, a "de-activation" mechanism may automatically take care of marking the (newly deployed) patched version as "active" and any previous version of this (sub-)workflow (or task) as "inactive". As a result, only one version of a (sub-)workflow's (or task's) version history may be active and will actually be triggered when data is passed to the respective service interface.

Message broadcast use-cases, in which multiple different workflows or tasks may implement the same service interface to jointly process one and the same request, are transparently covered without any architectural changes. This is due to the fact that the afore-mentioned de-activation mechanism applies to previous versions of the specific (sub-)workflow (or task) which gets deployed. Other workflows or tasks which reference the same service interface may be unaffected and remain "active". As a result, there may be multiple active workflows and tasks for the same service interface at a time.

Changes to a (sub-) workflow's (or task's) referenced service interface (e.g., by modifying the WSDL), will cause the invoking workflow to fail when invoking the sub-workflow/task. This is due to the fact that the old version of the sub-workflow/task was de-activated, and the new ("patched") version was activated but references another service interface which is different from the service interface that is referenced in the invoking workflow.

At build time, process model artifacts are transformed into their runtime format (which may be different from the design time model) and packaged into a deployable archive. Artifact dependencies may establish a build order where referenced artifacts are built (i.e., transformed into runtime format and packaged) before the referencing artifacts. For instance, a service interface may be built before any workflow which references this service interface is built. Any artifact may additionally be labeled with a version identifier, representing a unique string that is deterministically derived from the artifact (e.g., by computing a MD5 hash out of the artifact's binary runtime representation). To facilitate stable linking of referenced artifacts, the version identifiers of all referenced artifacts are incorporated into the version identifier of the referencing artifact. As a result, an artifact's version identifier changes if and only if one of its referenced artifacts' version identifiers has changed or the artifact itself was semantically changed and exhibits an altered runtime behavior. For instance, a workflow's version identifier may change if a process step is added (i.e., semantical change of the workflow itself) or a data object's data type has changed (i.e., semantical change of the referenced data type).

A BPM runtime may evaluate and compare artifact versions to avoid redundant resource allocation at runtime. Whenever multiple artifacts' version identifiers are identical, the BPM software may provide a single runtime representation. Artifacts having identical version identifiers may both appear in the same process model (thus, originating from a single deployment of a specific process model); in subsequent revisions ("patches") of the same process model (originating from subsequent deployments of a specific process model); or in different process models (originating from different deployments of different process models).

Alternatively, the proposed invention may subsume multiple artifacts which are jointly versioned as a composite artifact. For instance, multiple data types may be assembled into a composite artifact, having a single version identifier. Process model artifact (such as workflows) which use a single data type need to reference the corresponding composite artifact which comprises this data type. Composite artifacts may be used to reduce the number of fine-granular artifacts (such as single data types) within a process model. As a result, both build times and resource consumption of the artifacts' runtime representation may be improved.

Hierarchical versioning systems and methods, as described herein, address several primary requirements being reduced runtime resource consumption for static process model data, stable linking of process artifacts, and patchability of workflows and tasks.

Process models are made up of multiple artifact types such as workflows, tasks, data mappings, data types, service interfaces, translatable texts, business rules, and the like. At runtime, these artifacts are handled by different components across the BPM runtime system software stack. Some of these artifacts may be reused in multiple process models and should, thus, not appear as redundant replicas in the runtime. For instance, two workflows may use the same data type within their process contexts (as data type of data objects). It may be desirable to have at most one corresponding runtime representation. Moreover, some artifacts may be changed (i.e., modified at design time, built, deployed into runtime) less frequently than others.

After subsequent deployments of the recurrently patched process model into the BPM runtime, the unchanged portions of the process model should not redundantly allocate runtime resources, such as main memory. For instance, a service interface may undergo fewer changes than its referencing workflow which is frequently patched. By separating the process model portions into distinct artifacts, artifacts are separately versioned which allows for detecting changes on an artifact level. The complete process model is split into more fine-granular artifacts, reflecting the above mentioned artifact types. Each of those artifacts is separately built according to an acyclic dependency graph, such as the graph shown in FIG. 1. Accordingly, each artifact is separately versioned. An artifact's version will only change if its content was modified since the last build.

In contrast to traditional applications, business processes may spawn long-running instances which need to behave deterministically and predictable for their complete lifetime. Those instances may span over intermediate development cycles, involving deployments of a patched process model. Despite a new workflow version being deployed, the running process instances for the most part complete their runs unaffected (i.e., without being subject to the modifications in the new version). Thus, a new version does not simply override a previously-deployed version but is cleanly separated at runtime.

Deviating from the stable linking requirement, tasks and sub-workflows may be "patchable". That is, whenever a task or workflow is modified, any referencing workflows shall automatically incorporate those changes by re-directing invocations of the original tasks or sub-workflows to the corresponding "patched" versions. That implies that the referencing workflows do not need to be adapted but continue to indirectly reference the modified subflow/task through the same, stable service interface. Patchability shall apply to both newly started or already running (at the time of deployment) process instances. That is, any new sub-workflow (or task) invocation shall be re-directed to the "latest" version of that flow/task. Technically, the "latest" version is flagged as "active" while the previously active version will be de-activated. Obviously, both versions need to adhere to the same service interface to make an automatic redirection of subflow and task invocations work without modifying the referencing flow.

Figure 2:
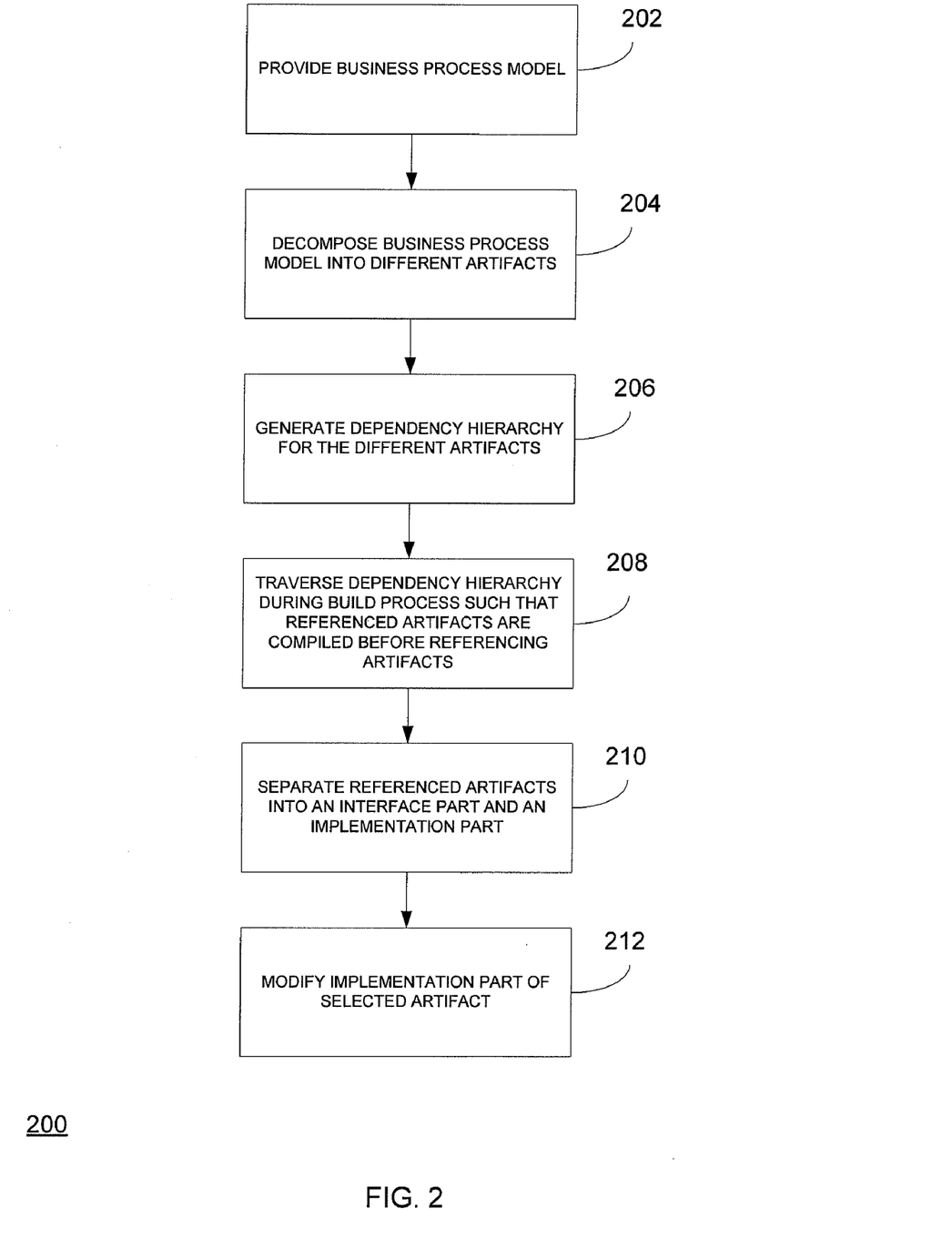
FIG. 2 is a flowchart of a versioning method for a business process model.

In accordance with preferred implementations, and as illustrated in FIG. 2, a hierarchical versioning method 200 is introduced into business process models 202. At 204, a process model is decomposed into different artifacts, including workflows (e.g., BPMN diagrams), data mappings (e.g., XSLT transformations), tasks (e.g., WS-HumanTask-compliant task implementations), translatable texts (e.g., XLIFF files), data types (e.g., XSD files), and so on. At 206, a dependency hierarchy is generated for the different artifacts.

By separating a process model into different artifacts, the problem of lean resource consumption is addressed: spawning a new version of an artifact will not automatically propagate to all other artifacts but solely have an impact on the referencing artifacts. For artifacts outside this dependency chain, the version will remain stable, and thus not create any redundant runtime representations. Artifacts span a dependency hierarchy where one artifact may depend on another referenced artifact. For instance, a data mapping may depend on a set of data types that are used within the mapping instructions. Likewise, a workflow may depend on a service interface to invoke other workflows that are known as sub-workflows.

During a build process (i.e., transformation of the process model data into executable processes), at 208 the dependency hierarchy is traversed in a way that referenced artifacts are built before the dependent (referencing) artifact. As part of a process of building an artifact, a unique version identifier of that artifact is computed which reflects the content and runtime semantics of that artifact. The version identifier is incorporated into the referencing artifact's version identifier. In this way, the dependent artifact may incorporate the referenced artifact's version for linking against a concrete version, and the dependent artifact's version will automatically change whenever one of the referenced artifact's versions has changed. This procedure enforces a new version of the referencing artifact (which uses the referenced artifact) whenever there is a new version of the referenced artifact. In this way, stable linking of artifacts that are transitively referenced from a process model are guaranteed, since referenced artifacts are identified by their concrete version, which changes whenever the artifact changes.

Figure 3:
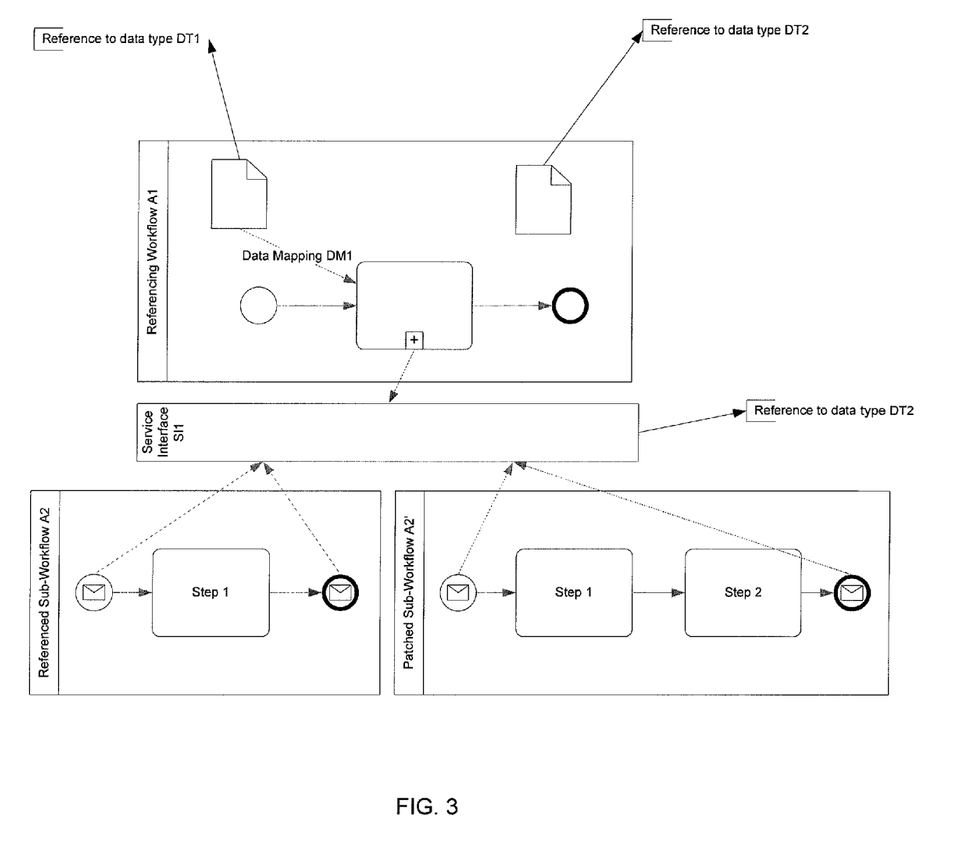
FIGS. 3 and 4 illustrates the patching technique on top of a concrete example business process model.
Figure 4:
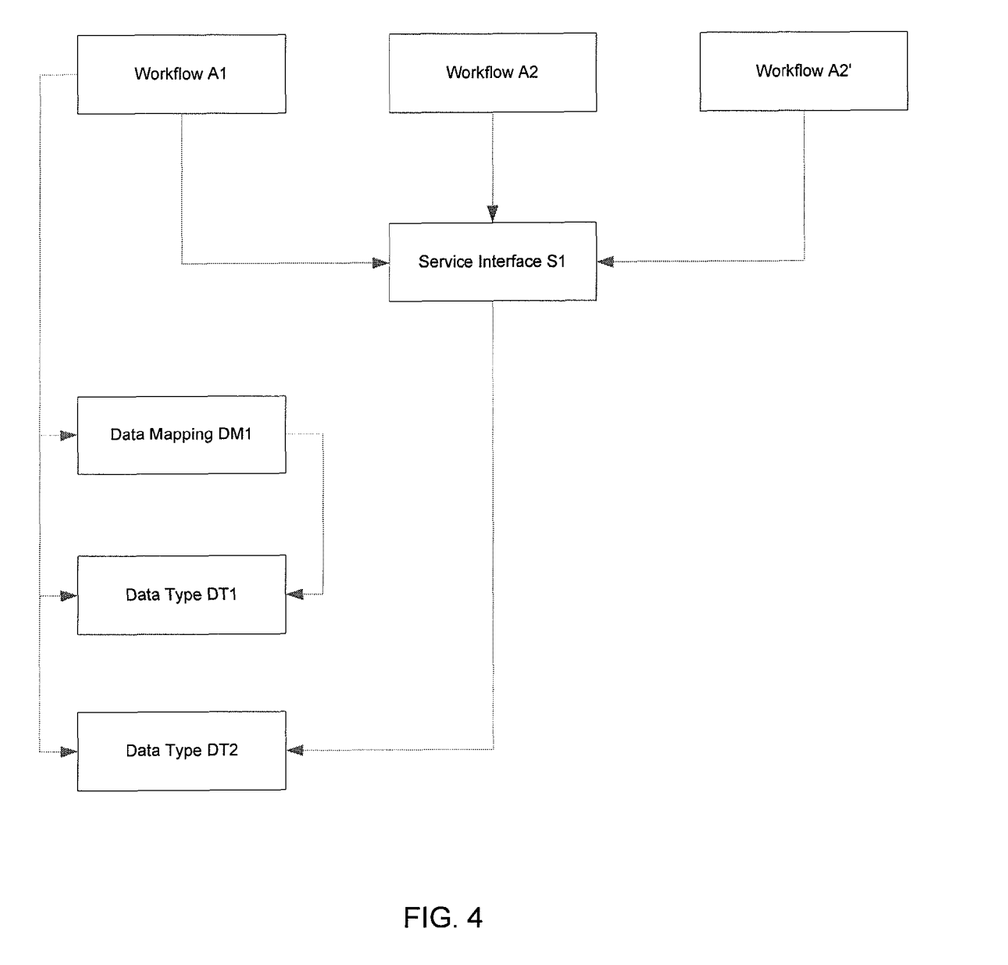

FIGS. 3 and 4 show a referencing workflow A1, a referenced sub-workflow A2 and a patch thereof A2' alongside some of their artifact dependencies, which includes: a data mapping DM1; a data type DT1, which is used from both A1 through a data object within the workflow model and DM1; and a data type DT2, which is used from A1 and the service interface SI1. The service interface SI1 is referenced from A1, A2, and A2', allowing A1 to invoke A2 (or A2') as a sub-workflow without having direct references between the two workflows. When A2 is patched to become A2', its implementation changes whereas the referenced service interface remains identical.

The issue of patchability is addressed by leveraging the above described hierarchical versioning approach. Instead of creating a direct dependency in between two artifacts, the referenced artifact (workflow or task) is split into a service interface part (SI1) and an implementation part (A2), e.g., at 210 of FIG. 2. The implementation part A2 establishes a dependency onto the interface part SI1. Similarly, a referencing workflow solely references the interface part SI1, thus, de-coupling from changes in the associated implementation A2, i.e. at 212 of FIG. 2. The benefit of this approach is that the implementation part A2 may change (resulting in a new version A2') without affecting the invoking artifacts (here: A1), which only reference the interface (here: SI1). The modified artifact implementation A2' is built and deployed onto the runtime where it needs to be "activated," whereas old versions of A2 are made "inactive." In this way, any call from A1 to the interface SI1 will automatically redirect to the latest version A2'.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method of versioning a business process model, the method comprising:
   decomposing the business process model into a plurality of artifacts;
   generating a hierarchical dependency graph for an artifact of the plurality of artifacts, the hierarchical dependency graph comprising a set of referencing artifacts that reference and are therefore dependent on the artifact and a set of referenced artifacts that the artifact references and is therefore dependent upon;
   traversing the hierarchical dependency graph during a first build process to transform process model data into a first executable process based on the process model, the traversing comprising compiling each referenced artifact of the set of referenced artifacts prior to the artifact and compiling each referencing artifact of the set of referencing artifacts after the artifact, the compiling comprising creating a runtime format for each of the artifact and the referencing and referenced artifacts and computing a unique version identifier for the artifact, for each referencing artifact of the set of referencing artifacts, and for each referenced artifact of the set of referenced artifacts;

incorporating the unique version identifier for each referenced artifact of the set of referenced artifacts into the unique version identifier of the artifact and also incorporating the unique version identifier for the artifact into the unique version identifier for each referencing artifact of the set of referencing artifacts;

modifying the unique version identifier of the artifact to reflect a change to a new version of one referenced artifact of the set of referenced artifacts and also modifying at least one referencing artifact of the set of referencing artifacts to reflect the modifying of the unique version identifier of the artifact, the modifying and the also modifying occurring without altering the unique version identifier of referenced artifacts of the set of referenced artifacts other than the one referenced artifact changed to the new version;

redirecting, based on the modifying, the unique version identifier of the artifact incorporated in the unique version identifier of each referencing artifact of the set of referencing artifacts; and re-traversing the hierarchical dependency graph during a second build process to transform process model data into a second executable process based on the process model, the re-traversing comprising incorporating the modified unique version identifier of the artifact and the redirected unique version identifier of the artifact incorporated in the unique version identifier of each referencing artifact of the set of referencing artifacts such that the first executable process is not affected by the modifying and the redirecting.

2. The computer-implemented method in accordance with claim 1, further comprising separating the one referenced artifact of the set of referenced artifacts into an interface part and an implementation part, the implementation part being updated to the new version while the interface part remains unchanged such that one or more invoking artifacts that only reference an interface of the one referenced artifact are not affected by the modifying.

3. The computer-implemented method in accordance with claim 2, wherein computing the unique version identifier for the one referenced artifact further comprises connecting the unique version identifier to the interface part of the one referenced artifact, or to the referenced artifact itself.

4. The computer-implemented method in accordance with claim 3, further comprising creating a reference from the artifact to the interface part of the one referenced artifact, or to the one referenced artifact itself.

5. The computer-implemented method in accordance with claim 1, wherein the artifact comprises a workflow, the workflow being a business process model and notation diagram.

6. The computer-implemented method in accordance with claim 5, wherein each artifact in the plurality of artifacts other than the artifact comprises a service interface, a data mapping, tasks, translatable text, and one or more data files.

7. An article comprising tangibly embodied non-transitory computer-readable media operable to cause data processing apparatus to perform operations for versioning a business process model, the operations comprising:

decompose the business process model into a plurality of artifacts;

generate a hierarchical dependency graph for an artifact of the plurality of artifacts, the hierarchical dependency graph comprising a set of referencing artifacts that reference and are therefore dependent on the artifact and a set of referenced artifacts that the artifact references and is therefore dependent upon;

traverse the hierarchical dependency graph during a first build process to transform process model data into a first executable process based on the process model, the traversing comprising compiling each referenced artifact of the set of referenced artifacts prior to the artifact and compiling each referencing artifact of the set of referencing artifacts after the artifact, the compiling comprising creating a runtime format for each of the artifact and the referencing and referenced artifacts and computing a unique version identifier for the artifact, for each referencing artifact of the set of referencing artifacts, and for each referenced artifact of the set of referenced artifacts;

incorporate the unique version identifier for each referenced artifact of the set of referenced artifacts into the unique version identifier of the artifact and also incorporating the unique version identifier for the artifact into the unique version identifier for each referencing artifact of the set of referencing artifacts;

modifying the unique version identifier of the artifact to reflect a change to a new version of one referenced artifact of the set of referenced artifacts and also modifying at least one referencing artifact of the set of referencing artifacts to reflect the modifying of the unique version identifier of the artifact, the modifying and the also modifying occurring without altering the unique version identifier of referenced artifacts of the set of referenced artifacts other than the one referenced artifact changed to the new version;

redirect, based on the modifying, the unique version identifier of the artifact incorporated in the unique version identifier of each referencing artifact of the set of referencing artifacts; and re-traverse the hierarchical dependency graph during a second build process to transform process model data into a second executable process based on the process model, the re-traversing comprising incorporating the modified unique version identifier of the artifact and the redirected unique version identifier of the artifact incorporated in the unique version identifier of each referencing artifact of the set of referencing artifacts such that the first executable process is not affected by the modifying and the redirecting.

8. The article in accordance with claim 7, further comprising operations to cause the data processing apparatus to separate the one referenced artifact of the set of referenced artifacts into an interface part and an implementation part, the implementation part being updated to the new version while the interface part remains unchanged such that one or more invoking artifacts that only reference an interface of the one referenced artifact are not affected by the modifying.

9. The article in accordance with claim 8, further comprising operations to cause the data processing apparatus to connect the unique version identifier of the artifact to the interface part of the one referenced artifact, or to the one referenced artifact itself.

10. The article in accordance with claim 9, further comprising operations to cause the data processing apparatus to create a reference from the artifact to the interface part of the one referenced artifact, or to the one referenced artifact itself.

11. A system comprising:

at least one programmable processor; and a machine-readable medium storing instructions that, when executed by the at least one processor, cause the at least one programmable processor to perform operations comprising:

generating a hierarchical dependency graph for an artifact of the plurality of artifacts, the hierarchical dependency graph comprising a set of referencing artifacts that reference and are therefore dependent on the artifact and a set of referenced artifacts that the artifact references and is therefore dependent upon;

traversing the hierarchical dependency graph during a first build process to transform process model data into a first executable process based on the process model, the traversing comprising compiling each referenced artifact of the set of referenced artifacts prior to the artifact and compiling each referencing artifact of the set of referencing artifacts after the artifact, the compiling comprising creating a runtime format for each of the artifact and the referencing and referenced artifacts and computing a unique version identifier for the artifact, for each referencing artifact of the set of referencing artifacts, and for each referenced artifact of the set of referenced artifacts;

incorporating the unique version identifier for each referenced artifact of the set of referenced artifacts into the unique version identifier of the artifact and also incorporating the unique version identifier for the artifact into the unique version identifier for each referencing artifact of the set of referencing artifacts;

modifying the unique version identifier of the artifact to reflect a change to a new version of one referenced artifact of the set of referenced artifacts and also modifying at least one referencing artifact of the set of referencing artifacts to reflect the modifying of the unique version identifier of the artifact, the modifying and the also modifying occurring without altering the unique version identifier of referenced artifacts of the set of referenced artifacts other than the one referenced artifact changed to the new version;

redirecting, based on the modifying, the unique version identifier of the artifact incorporated in the unique version identifier of each referencing artifact of the set of referencing artifacts; and re-traversing the hierarchical dependency graph during a second build process to transform process model data into a second executable process based on the process model, the re-traversing comprising incorporating the modified unique version identifier of the artifact and the redirected unique version identifier of the artifact incorporated in the unique version identifier of each referencing artifact of the set of referencing artifacts.

12. A system as in claim 11, wherein the operations further comprise:

splitting one referenced artifact of the set of referenced artifacts into a service interface part and a first version of an implementation part, the referenced artifact being referenced by using a reference to the service interface part that further references the implementation part;

modifying the first version of the implementation part of at least one referenced artifact to produce a new version of the implemented part; and redirecting, based on the modification, reference between the service interface part and the first version of the implementation part to a reference between the service interface part and the new version of the implemented part.

13. The system of claim 11, wherein the redirecting modifies the hierarchical dependency graph while maintaining a hierarchy of artifacts characterized by the hierarchical dependency graph.

14. The system of claim 11, wherein at least one artifact of the plurality of artifacts comprises a workflow.

* * * * *